Figure 1:
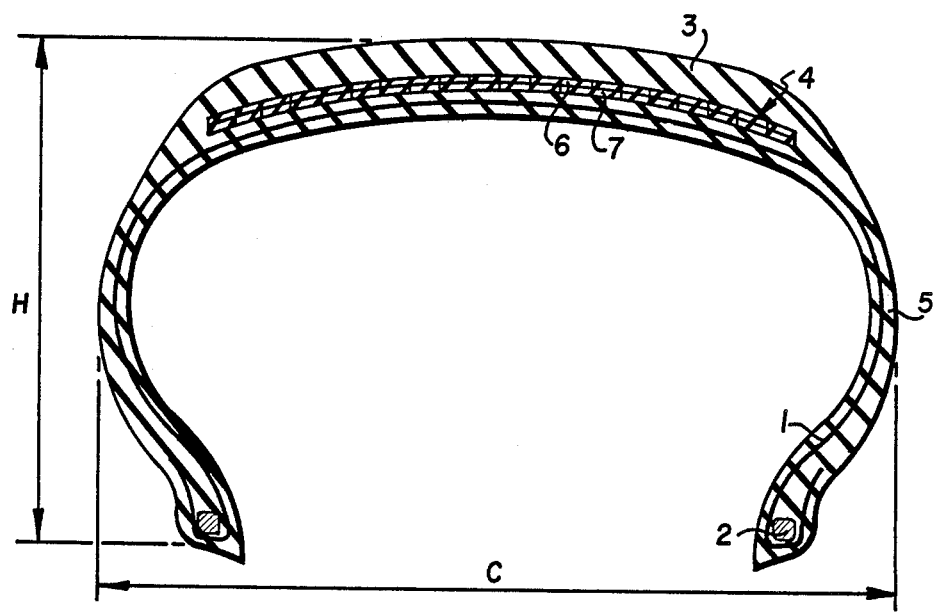

United States Patent [19]

Caretta

[11] Patent Number: 4,819,705
[45] Date of Patent: Apr. 11, 1989

[54] VEHICLE TIRES WITH LOW ABSORPTION OF HORSE-POWER

[75] Inventor: Renato Caretta, Gallarate, Italy

[73] Assignee: Industrie Pirelli S.p.A., Italy

[21] Appl. No.: 555,447

[22] Filed: Nov. 28, 1983

Related U.S. Application Data

[63] Continuation of Ser. No. 368,570, Apr. 15, 1982, abandoned.

[30] Foreign Application Priority Data

Apr. 16, 1981 [IT] Italy ................................ 21212 A/81

[51] Int. Cl.⁴ .............................................. B60C 09/18
[52] U.S. Cl. ................................................... 152/527
[58] Field of Search .......... 152/36 R, 36 FP, 36 DM, 152/359

[56] References Cited

U.S. PATENT DOCUMENTS

| | | | |
|---|---|---|---|
| 3,298,417 | 1/1967 | Keefe, Jr. .................. | 152/330 R |
| 3,513,898 | 5/1970 | Lugli et al. .................. | 152/361 R |
| 3,921,691 | 11/1975 | Kenyon et al. .................. | 152/359 |
| 4,047,552 | 9/1977 | Maeda et al. .................. | 152/361 DM |
| 4,360,397 | 11/1982 | Caretta .................. | 152/361 R |

Primary Examiner—David Simmons
Assistant Examiner—Ramon R. Hoch
Attorney, Agent, or Firm—Stevens, Davis, Miller & Mosher

[57] ABSTRACT

A pneumatic tire for motor vehicles has a low absorption of horse-power. The tire has an annular tread reinforcing structure disposed in the crown which comprises two layers of rubberized fabric with metallic cords having a diameter of not more than 0.603 mm embedded therein; the radial reciprocal distance between the centers of two facing cords in the radial direction on the cross-section of the tire is not over 1 mm.

7 Claims, 2 Drawing Sheets

VEHICLE TIRES WITH LOW ABSORPTION OF HORSE-POWER

This application is a continuation of application Ser. No. 368,570, filed Apr. 15, 1982, now abandoned.

The present invention relates to radial tires for vehicles, i.e. those tires wherein the cords of the carcass plies which extend from one bead to the other, lie substantially on radial planes.

In particular, the present invention relates primarily to automobile tires and applies to radial tires having a low rolling resistance and hence, absorb less horse-power than known vehicle tires.

The absorption of horse-power by a motor vehicle tire has gradually become more and more important recently, because of two primary reasons. On one hand, owing the improvement in tire performance already obtained with the modern structural characteristics of the tire, a further improvement can only be reached by a reduction of the horse-power absorption by the tire, while on the other hand, because of increasing fuel costs, it is even more desirable to have tires which run smoothly.

Tire builders have thus turned their attention to possible modification of various components of the tire structure, with particular regard to the tread which absorbs a significant percentage of the total horse-power absorbed by the tire. However, modification of the belt structure to reduce horse-power absorption of the tire has not been attempted heretofore because the belt of a radial tire has a delicate equilibrium which is directly related to tire behavior on a road surface and also effects the length of the useful life of the tire.

In other words, movement of the tread blocks in the ground-contact area, and hence, the wear-and-tear of the tire, the road-gripping when cornering, the steerage of the tire, its sensitivity and prompt steering-response and its comfort during ride are all, at least to some extent, influenced by the belt.

Since variations in the belt structure influence so many properties of a tire, it follows that any modification of the belt structure to reduce absorption of horse-power would be likely to cause weakening of the tire with attendant adverse effect on road behavior such as poorer response to transverse forces during cornering and to steering, and the sensitivity of the tire to tangential forces near its surface contact area increased significantly. In fact, if modification of the belt results in more deformation of the tire under load, adverse effects may more than offset any improvement obtained in horse-power absorption.

It is true that one may consider restoring at least in part, the qualitative characteristics that are lost by increasing the inflation pressure of the tire to preserve the driving behavior thereof. But this will increase the specific load on the tread blocks disposed in the ground-contact area, and hence, at the same time, increase wear of the tread and absorption of horse-power.

It has now been found that it is possible to reduce significantly the resistance-to-rolling of a tire, by modifying the structural characteristics of the belt without significantly sacrificing road behavior of the tire.

An object of this invention is to provide a pneumatic tire for a vehicle, especially advantageous for automobiles, which absorbs less horse-power than prior art pneumatic tires and is at least equal to prior art tires in road behavior. Another object of the invention is to reduce the horse-power absorption of a radial pneumatic tire for automobiles without adversely affecting the road behavior of the tire. A further object of the invention is to modify the structure of a vehicle pneumatic tire having a radial carcass, a tread band and an annular tread reinforcing belt disposed between the tread band and carcass to reduce horse-power absorption as the tire rotates over a road surface without adversely affecting the road behavior of the tire.

Figure 6:
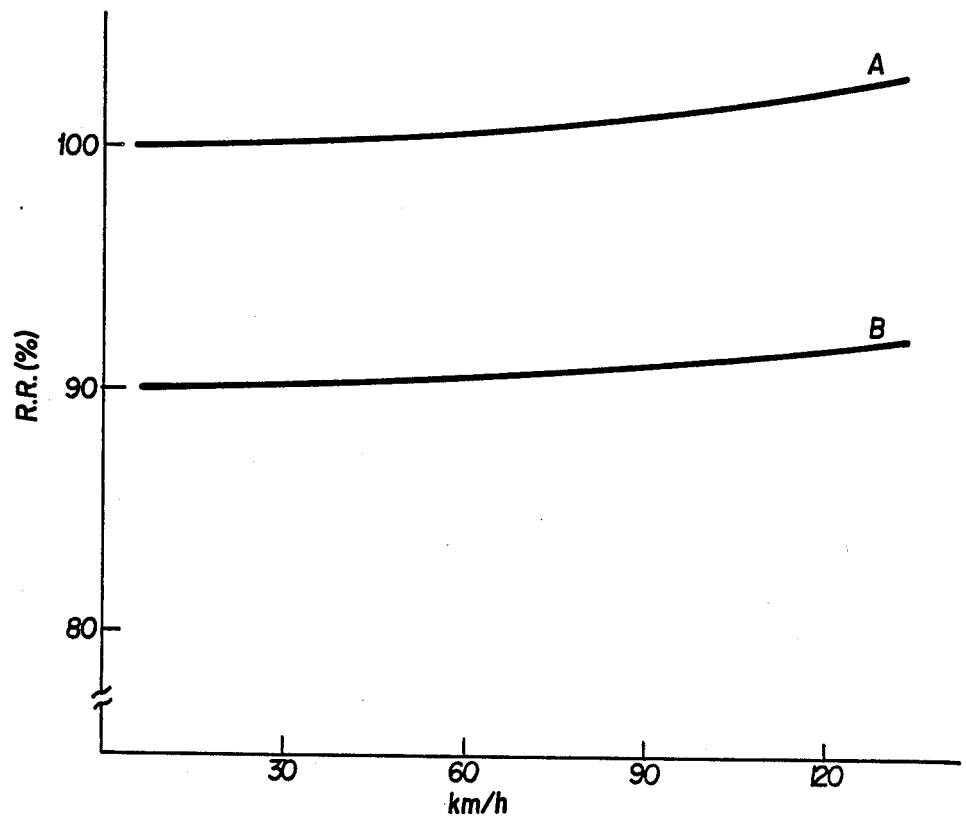

Other objects will become apparent from the following description with reference to the accompanying drawing wherein FIG. 1 is a cross-section of one embodiment of the pneumatic tire for vehicles provided by the invention;

FIGS. 2, 3, 4 and 5 are diagrammatic representations of the cross-section of the annular tread band reinforcing structure provided by the invention; and FIG. 6 compares in graph form the rolling resistances of a prior art tire with an embodiment of the tire provided by the invention.

The foregoing objects and others are accomplished in accordance with the invention, generally speaking, by providing an improved annular reinforcing structure, or belt, for a pneumatic tire having a radial carcass and the annular reinforcing structure disposed between the carcass and a tread band which tire absorbs less horse-power as the tire rolls over a road surface and responds to steering and cornering similar to the response of the heretofore available corresponding tires of the same size but having prior art annular tread band reinforcing structures.

The invention thus provides a pneumatic tire for vehicle wheels, especially automobile wheels, having a carcass with radial cords, two sidewalls the maximum reciprocal distance of which, in the axial sense, determines the width of the tire section, two bead heels, at least one bead-core in each bead heel, the ends of the cords of the carcass being turned-up around the bead cores, a tread-band disposed on the crown of the carcass, and an annular reinforcing structure that is circumferentially inextensible, interposed between the tread-band and carcass, the annular reinforcing structure having a width that is substantially equal to the width of the tread-band and having two radially overlapped layers of rubberized fabric reinforced with metallic cords, the cords being parallel to each other in each layer and crossed with the cords of the facing layer and inclined at an angle between 5° and 30° with respect to the equatorial plane of the tire; the tire being characterized by the fact that the diameter of the metallic cords is no larger than 0.603 mm, the reciprocal radial distance, between the centers of two facing cords on the plane of the cross-section of the tire, not being larger than 1 mm and preferably between 0.5 and 1 mm.

Quite conveniently, the metallic cords may be three, four or even five elementary wires twisted together into a strand, with each wire having a diameter of 0.12 to 0.25 mm.

As an alternative to the metallic cords, single untwisted steel wires having diameters within the above-indicated range may be used.

The density of the cords or of the single wires is greater than the density of sixty cords per decimeter and is preferably between 70 and 140 cords per decimeter. The H/C ratio of the tire according to the invention, is preferably not over 0.8.

With reference to FIG. 1, the illustrated tire has a carcas formed of textile cords 1, disposed substantially at 90° with respect to the circumferential direction of the tire and turned-up at their ends around a bead-wire 2 for reinforcing the bead-heel. Alternately, metallic cords may be substituted for the textile cords 1.

The carcass has a tread-band 3 on its crown zone and, interposed between tread-band 3 and the carcass cords 1, an annular reinforcing structure 4, that is circumferentially inextensible, often referred to as a breaker or belt.

Technicians commonly use the expression 'C' (width of cross-section of inflated tire i.e. the maximum axial distance between the sidewalls 5 of the tire), and 'H' (section height of the inflated tire) and particularly the H/C ratio to define the type of tire. It is known that from the past to the present, tires have progressively changed in their H/C ratio from H/C=1("stand-up" series) of the old tires having crossed carcass plies, to the very recent H/C=0.65 of the more modern radial tires ("low aspect" series).

The annular breaker structure 4, which has also been illustrated in detail in FIGS. 2 to 5, has two radially overlapping layers of metallic rubberized fabric, i.e. two layers 6 and 7 of metallic cords 8 embedded in an elastomeric composition that prevents any reciprocal contact between adjacent cords of the same layer (i.e. in the axial direction) and moreover, in the radial direction between the cords of the two facing layers.

One or several layers or strips of textile cords, preferably, but not exclusively those of a material that shrinks under the effects of heat, such as, for example, nylon may be added to layers 6 and 7. For example, the belt structure may have in a radially external position with respect to the two layers 6 and 7 of metallic rubberized fabric, one or more layers 9 (FIG. 3) of nylon cords, preferably, of the same width as the underlying layers 6 and 7, with the cords being oriented at an angle between 0° and 10° with respect to the circumferential direction of the tire or as two small strips 10 (FIG. 4) of nylon cords disposed according to the orientation, fitted onto each end of the pack of layers 6 and 7, wound in one or several turns, or even a combination of both of these versions. It is intended however, that the textile strips and layers are only additional to the structure of the invention i.e. they are elements that, although important for their effect on the global tire-behavior, as far as the present invention is concerned, used in addition to and not as substitutes for layers 6 and 7.

According to the invention, cords 8 have a diameter 'd', that is not over 0.603 mm, while the reciprocal radial distance 'h' between the centers of two facing cords, in the plane of the cross-section, is not over 1.0 mm.

The condition just established, is easily understood from FIGS. 2 through 5 in which the dimensions 'h' (the distance between the cords) and 's' (thickness of the layer of elastomeric material in the radial direction between the cords of the facing layers) take the index corresponding to the number of the relative Figure.

Figure 2:
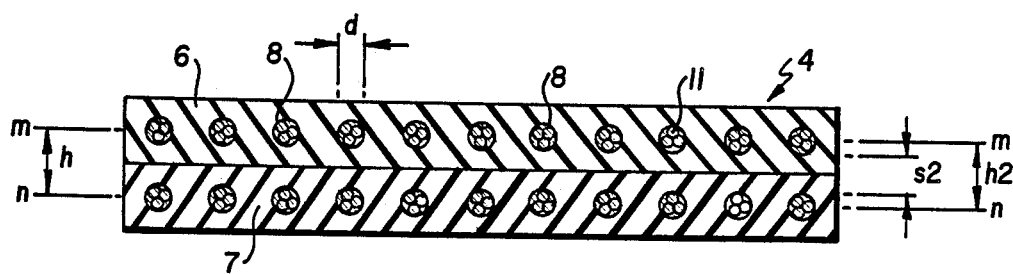

FIG. 2 illustrates one embodiment of the invention developed on a series of tires size 185/65-13, where 185 indicates the maximum width of the tire in mm, i.e. the value 'C' given above; 65 indicates the ratio H/C×100 (i.e. H/C=0.65), and 13 indicates in inches the diameter of the mounting rim.

The metallic cords of the two layers 6 and 7 of FIG. 2 are 1×3/0.25 i.e. twisted strands constituted by three elementary wires 11, each one having a diameter of 0.25 mm.

The cords are distributed in the layers 6 and 7 with a density 'F' equal to 100 cords per decimeter.

The FIG. 2 shows the lines m-m and n-n, on which are lying the centers of the cords 8. These lines represent the mid-planes viewed on the cross-section, of the metallic layers contained between the planes p, q, r, z, tangent to the metallic cords 8 of each layer in a position, respectively radially outwardly and radially inwardly, as has been illustrated for better clarity in FIGS. 3, 4 and 5.

The radial distance 'h' between the centers of the cords, coincides with the distance between the planes m-m and n-n, and for all the cords having formations that allow a circumference circumscribing their cross-section, the distance coincides also with the distance between the centers of the circumscribed circumferences.

The above condition is true, for example, for cords 1×3 and 1×4, but not for cords 1×5, as will now be better explained.

Let us consider first the structure of FIG. 2, formed with cords 1 x 3. These cords admit a circumference circumscribing their cross-section, as illustrated in FIG. 2, and hence, the center of the cord coincides with the center of the circumscribing circumference and lies on the line m-m of the mid-plane, the thickness of the metallic layer being coincident with the diameter of this circumscribing circumference.

Figure 3:
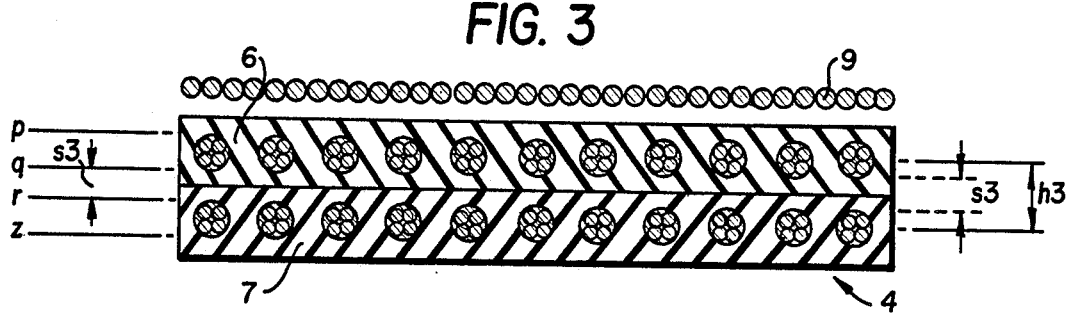

Turning now to FIG. 3, the annular structure of the invention has been formed in a similar way to the one of FIG. 2, with the metallic cords 1×4. It is clear that even these cords have a circumference circumscribing their cross-section, for which reason what was already said when dealing with 1×3 cords, is still true.

Figure 4:
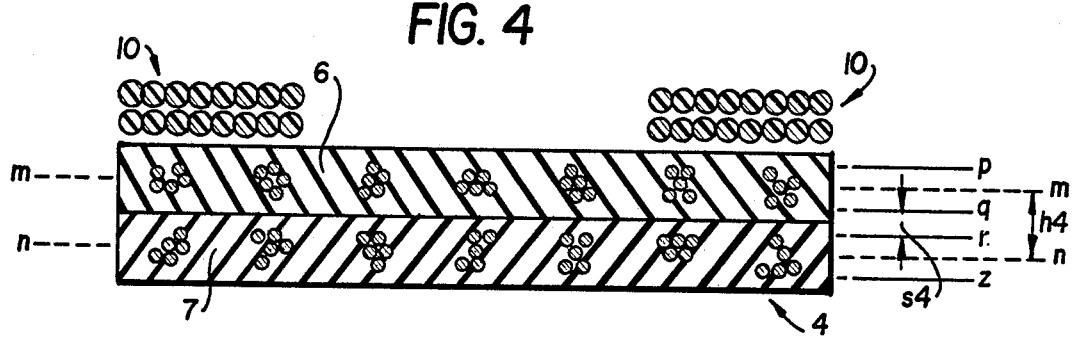

Instead, in FIG. 4 the annular structure is made with 1×5 cords. In this case it is not possible to speak, in practice, of a circumference circumscribing the cross-section.

This circumference in fact, exists only for a regular distribution of the five elementary wires around the axis of the cord, which distribution is difficult to obtain in the phase of forming the cord and also impossible to be maintained during the usual process for rubberizing the metallic fabric by means of a calendering process.

In this case, as a radial distance h between the centers of the cords of the two layers, there must be assumed the radial distance h between the lines m-m and n-n, on the plane of the cross-section, that are the mid-plane lines with respect to the metallic layers determined by the two planes (p and q; r and z) tangent in each layer of metallic fabric, the metallic cords of the layer in a position that is respectively radially inward and radially outward.

It therefore is apparent that, once a cross-section of the tire to be examined has been carried out, it is relatively easy to determine, in practice, the position of the lines m-m and n-n and their reciprocal radial distance h4, while it would not be possible to determine the center of the cords 1×5.

Figure 5A:
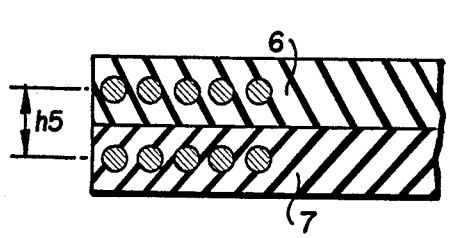
Figure 5B:
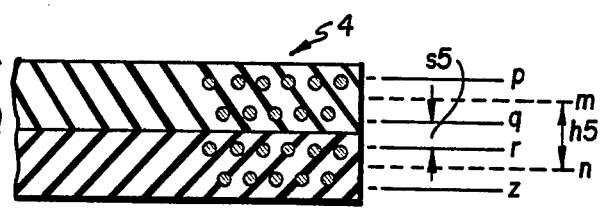

Moreover, in FIG. 5, the annular reinforcing structure is made with single metallic wires. According to whether these wires lie on the same plane in each layer, (see left margin of FIG. 5), or whether they are distributed at different radial heights (see right margin of FIG. 5), consideration valid for the circumscribing circumference, coincident in this case with the cross-section of each wire, can be applied or instead those explained in connection with FIG. 4. Again, it is clear where single metallic wires are used, the words "metallic cord" in the present text identifies also the single wires.

It has already been said that h, along the entire width of the structure is not over 1.0 mm and it is preferably between 0.5 and 1.0 mm. In practice, these values could be attained through the use of metallic cords having the formation 1×3, 1×4 and 1×5. Also single steel wires with diameters comprised between 0.12 and 0.25, mm combining variously between them the desirable characteristics, can be used in such a way however, as to respect the critical values defined previously.

Considering also the thickness of the elastomeric material (that for rubberizing the metallic fabric or even that of an additional layer inserted between the layers 6 and 7) between the metallic cords of the two layers—or rather, between the two planes "q" and "r" tangent to the cords of the two layers, in a position radially inward with respect to the belt structures, (the thickness indicated with "s" in the FIGS. 2-5) it must be noted that "s" can be as small as desired within the ranges allowed by the resistance to tears or cracks and to ageing of the compound utilized (for example, that of rubberizing the metallic fabric), but it cannot however be completely annuled since it would bring about the reciprocal metal-to-metal contact between the cords of the two radially facing layers. In practice, this value of "s" will not be lower than 0.20 mm.

Moreover, regarding the density to be assigned to the metallic cords of layers 6 and 7 of the tire of the invention, this density will always be greater than 60 cords per decimeter.

It is clear that the maximum value of this density must be such that elastomer of sufficient thickness is present to insulate in an axial direction adjacent metallic cords from each other. In any case, it has been found that the preferred densities are those between 70 and 140 cords per decimeter.

For further clarifying the invention, it should be defined that in the tires of the prior art, the distance h defined above, is always on the order of 1.50 mm, while in the belt structure substantially no cords having diameters smaller than 0.600 mm are used.

Considering, for example, a known tire having the same size as the one previously described, i.e. the presently commercially available 185/65-13 tire has layers 6 and 7 of rubberized metallic fabric provided with cords 1×5/0.25 F60, the thickness 's' of the elastomeric material interposed between the cords being equal to 0.8 mm, the distance 'h' of the whole being equal to about 1.50 mm.

The tire of the invention is the one with the belt illustrated in FIG. 2. The results of the comparison between the two tires are given in the graph of FIG. 6 that illustrates the path of the curve for the rolling resistance (Kg of the pulling force per ton of weight acting upon the wheel) at various speeds; the rolling resistances (RR) are expressed in percentage, in such a way as to leave out any effect of the other geometrical and structural characteristics of the tire that are identical for both tires.

The curve A represents the road-behavior of the prior art tire; the curve B shows the road-behavior of the tire of the invention. From the graph there can immediately be appreciated a gain of about 10% with regard to the rolling resistance for the tire of the invention.

The features which provide the improvement in the tire of the present invention are many and probably not all known and recognized.

One possible explanation is that an annular reinforcing structure, having the value of 'h' within the ranges of the invention, is more flexible than the known ones, but not so deformable as to induce, in the loaded tire, greater deformations than those which take place in the tires of the prior art.

Besides this, on the basis of the presently known techniques, thinning of the belt would have been expected to reduce the transverse rigidity with a consequent loss of tire response to transverse forces. In fact, in this situation the belt acts as a plate loaded with combined bending and compressive stress in the transverse direction, and, hence, tends easily to become buckled (proportionately to the dimension of thickness) with a consequent lack of lateral stability, and what is more, a sudden loss of tire grip when cornering.

Vice-versa, the surprising absence of these drawbacks could perhaps be linked to the compactness of the belt obtained through the contemporary variation both, in the dimension h as well as in the diameter of the metallic reinforcing cords of the belt layers. This compactness has probably also conditioned the characteristics of mobility of the trend blocks in the ground-contact area—and hence, the wearing out of the tire, that is equal to that of the known tires, and hence, also devoid of any foreseeable increase in the wear-and-tear that is linked to the greater flexibility of the breaker.

The structure of the belt of the invention has also proved to have further advantages, passing from the use of cords 1×5 to those of 1×4 and 1×3, and also to the single wires, as far as concerns the rubber-to-metal bodying and the resistance to fatigue of the intermediate layer of the elastomeric material between the cords of the layers 6 and 7.

In fact, the greater surface of the metal exposed to the bodying of the rubber with the use of cords having a reduced number of wires, reduces the specific force upon the sticky surface, thus favoring the life, or as an alternative, allowing for a reduction in the thickness of the intermediate layer, or preferably, in the thickness of the rubberizing of the belt fabric.

In both these cases, the heat which is developed in the intermediate layer by the repeated flexions resulting from the running of the tire is reduced. Thus, the usual separation between belt layers as the tire is used does not occur as quickly, in particular, at the ends of the belt which occur in the tires of the prior art due to breaking down through fatigue, of the layer of interposed elastomeric material.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A tire for a vehicle wheel with a carcass comprising radial cords, two sidewalls spaced apart a maximum distance, which, in the axial sense, determines the width of the tire section, two bead-heels each one of which comprises at least one bead-core around which are turned-up, from the inside towards the outside, the ends of the cords of the carcass, a tread-band disposed on the crown of the carcass, and an annular reinforcing structure that is circumferentially inextensible, interposed between said tread-band and said carcass, said annular reinforcing structure having a width that is substantially equal to that of said tread-band and comprising two radially overlapped layers of rubberized fabric reinforced with metallic cords, said metallic cords being parallel to each other in each layer and crossed with the cords of the facing layer and inclined at an angle of between 5° and 30° with respect to the equatorial plane of the tire, the reciprocal distance between the centers of two facing cords, on the plane of a cross-section of the tire, being not larger than 1 mm throughout the entire width of said annular reinforcing structure, said tire being characterized by the fact that said metallic cords are twisted strands made from at least three individual wires with a diameter of 0.12 to 0.25 mm, the diameters of said metallic cords being not larger than 0.603 mm, and being distributed in each layer with a density greater than 60 cords per decimeter.

2. The tire of claim 1 characterized by the fact that said metallic cords are assemblies of wires having geometrical configurations of 1×3, 1×4 and 1×5.

3. The tire of claim 1 characterized by the fact that said metallic cords are disposed in each layer with a variable density of from 70 to 140 cords per decimeter.

4. The tire of claim 1 characterized by the fact that the H/C ratio has a value of not larger than 0.8.

5. The tire of claim 1 characterized by the fact that in a radially external position to said layers of metallic cords and in correspondence of their ends, heat shrinkable textile cords are wound in at least one strip, at an angle of 0° to 10° with respect to the circumferential direction of the tire.

6. The tire of claim 1 comprising, in a radially outer position to said layers of metallic cords, at least one layer of heat shrinkable textile cords, said cords being inclined at an angle between 0° and 10° with respect to the circumferential direction of the tire, said layer of textile cords being at least substantially as wide as the underlying layers of metallic cords.

7. The tire of claim 1 characterized by the fact that the distance between a first plane tangent to the inner surface of the outer layer of cords and a second plane tangent to the outer surface of the inner layer of cords is not less than 0.2 mm when said planes are viewed in a cross-section across the width of the tire.

* * * * *